United States Patent Office 3,407,198
Patented Oct. 22, 1968

3,407,198
2H-1,2,3-BENZOTHIADIAZINE-1,1-DIOXIDES
John B. Wright, Kalamazoo, Mich., assignor to The Upjohn Company, Kalamazoo, Mich., a corporation of Delaware
No Drawing. Filed Aug. 10, 1966, Ser. No. 572,651
8 Claims. (Cl. 260—243)

ABSTRACT OF THE DISCLOSURE 2H-1,2,3-benzothiadiazine-1,1-dioxides with a basic side chain in the 2-position are prepared by alkylating with an aminoalkyl halide the corresponding 2H-1,2,3-benzothiadiazine-1,1-dioxides. The alkylated compounds are useful as central nervous system stimulants and also as intermediates for the preparation of mothproofing agents, pickling inhibitors, and herbicides.

---

This invention is directed to benzothiadiazine dioxides containing a basic side chain.

The benzothiadiazine dioxides contemplated herein can be represented by the structural formula

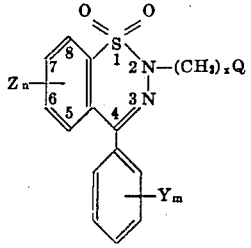

I wherein Q can be alkylamino, 1-pyrrolidinyl, alkyl-substituted 1-pyrrolidinyl, piperidino, alkyl-substituted piperidino, morpholino, or alkyl-substituted morpholino radical, and Z and Y can be halo, trifluoromethyl, alkyl, or alkoxy radicals, with the proviso that the alkyl portions of the foregoing radicals contain no more than four carbon atoms. The subscript $x$ is an integer having a value from 2 to 3, inclusive, and $n$ and $m$ are integers having a value from 0 to 3, inclusive.

Thus, the contemplated alkyl radicals are methyl, ethyl, propyl, isopropyl, butyl, isobutyl, sec.-butyl, and tert.-butyl; the contemplated alkoxy radicals are methoxy, ethoxy, the propoxy, and the butoxy radicals; illustrative of the contemplated alkylamino radicals are methylamino, ethylamino, the propylamino, and butylamino radicals including the dialkylamino moieties such as dimethylamino, diethylamino, N-methyl-N-ethylamino, the dipropylamino, the dibutylamino, etc.; illustrative of the contemplated alkyl-substituted 1-pyrrolidinyl radicals are 2-methyl-1-pyrrolidinyl, 3-methyl-1-pyrrolidinyl, 2,4-dimethyl-1-pyrrolidinyl, 3,4-dimethyl-1-pyrrolidinyl, 2,5-dimethyl-1-pyrrolidinyl, 2-ethyl-1-pyrrolidinyl, 2-ethyl-5-methyl-1-pyrrolidinyl, tetraethyl-1-pyrrolidinyl, 2,5-diethyl-3-butyl-1-pyrrolidinyl, etc.; illustrative of the contemplated alkyl-substituted piperidino radicals are 2-methylpiperidino, 2,5-dimethylpiperidino, 3-methyl-5-propyl-piperidino, 2,3,5,6-tetramethylpiperidino, 2-butylpiperidino, 2-butyl-6-propylpiperidino, etc.; illustrative of the contemplated alkyl-substituted morpholino radicals are 2,5-dimethylmorpholino, 3-ethylmorpholino, tetramethylmorpholino, 2,3-diethyl-5,6-dibutylmorpholino, 2-propyl-5,6-dibutylmorpholino, 2-methyl-6-butylmorpholino, etc.

The contemplated halo radicals are fluoro, chloro, bromo, and iodo.

Also contemplated and within the purview of the present invention are the corresponding acid addition salts of the foregoing compounds. The acid addition salts can be formed with acids such as hydrochloric, hydrobromic, sulfuric, phosphoric, nitric, acetic, benzoic, salicylic, glycolic, succinic, nicotinic, tartaric, maleic, malic, pamoic, methanesulfonic, picric, cyclohexanesulfamic, lactic, and the like.

The compounds of this invention, containing the basic side chain $-(CH_2)_xQ$ and shown by Formula I, are derived from a 2H-1,2,3-benzothiadiazine-1,1-dioxide which can be represented by the structural formula

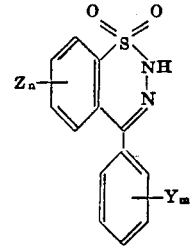

II wherein Z, Y, $n$, and $m$ have the same meaning as above for the compounds of Formula I. The derivation comprises alkylation of the compound shown by Formula II with a suitable aminoalkyl halide such as an alkylaminoalkyl halide, a 1-pyrrolidinylalkyl halide, an alkyl-substituted 1-pyrrolidinylalkyl halide, a piperidinoalkyl halide, an alkyl-substituted piperidinoalkyl halide, a morpholinoalkyl halide, or an alkyl-substituted morpholinoalkyl halide. In addition to the aminoalkylhalides, esters such as aminoalkyl tosylates can be employed.

The aminoalkyl halides can be represented by the structural formula $$X(CH_2)_xQ \qquad \text{III}$$

where $x$ and Q have the same meaning as above and X represents a halogen, preferably chlorine or bromine. These halides are known compounds and can be prepared by halogenation of the corresponding aminoalkanols which, in turn, can be prepared by reacting an amine with a haloalkanol in accordance with known methods, for example, in accordance with the teachings of Moffett, J. Org. Chem., 14, 862 (1949). Alternatively, the desired aminoalkanols can be prepared by heating an amine with a haloalkanoic acid ester and thereafter reducing the produced aminoalkanoic acid ester with lithium aluminum hydride according to the method described by Moffett, supra.

The halogenation of aminoalkanols to produce the aminoalkyl halides can be carried out using known halogenating agents such as thionyl bromide, thionyl chloride, phosphorus tribromide, phosphorus trichloride, and the like, following the procedure described by Moffett et al., J. Am. Chem. Soc., 77, 1565 (1955).

The alkylation is carried out using a strong base as the basic condensing agent. Preferably an alkali-metal hydroxide such as sodium hydroxide or potassium hydroxide is employed; however, also suitable are the alkaline earth metal hydroxides such as barium hydroxide and the like, or bases such as sodium amide or sodium hydride in benzene, toluene, xylene, dimethylformamide, or the like.

As an inert organic solvent for the alkylation reaction ethanol, ethanol-water solutions, dioxane, dioxane-water solutions, acetone, acetone-water solutions, and the like can be employed.

The alkylation usually is carried out at about the reflux temperature of the solvent employed or below. Preferably the alkylation is carried out at about room temperature. The particular temperature employed is not narrowly critical but is principally governed by the stability of the reactants and the reaction products, the rate of reaction, and the convenience of carrying out the alkylation reaction.

The 2H-1,2,3-benzothiadiazine-1,1-dioxides shown by Formula II can, in turn, be prepared by reacting a 2-benzoylbenzenesulfonyl halide with hydrazine. The reaction is usually carried out in an inert organic solvent such as pyridine, a lower aliphatic alcohol, e.g., methanol, ethanol, propanol, or the like, at reflux conditions. Also, a basic reaction medium is desirable. This latter condition can be achieved by the choice of solvent, e.g., pyridine, by the presence of excess hydrazine, or by the addition of a basic salt such as sodium acetate, sodium bicarbonate, sodium carbonate, potassium carbonate, or the like, to the solvent.

The overall synthetic route for the preparation of the compounds of this invention is set forth schematically below, with Z, Y, Q, x, m, and n having the same meaning as above.

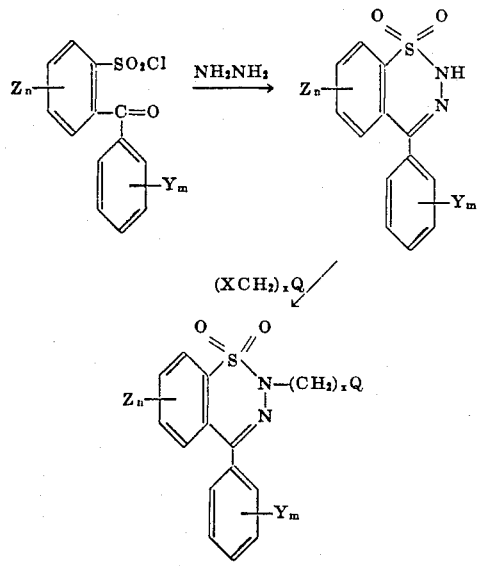

The 2-benzoylbenzenesulfonyl halides (IV) that can be employed in the above process can be prepared in accordance with the procedure set forth in Remsen et al., Am. Chem. J., 17, 354 (1895). In addition, 2-aminobenzophenones (V), a well-known class of compounds, can be reacted with nitrous acid and then with sulfur dioxide and a cupric halide in an acid medium, e.g., hydrochloric acid, to produce the corresponding 2-benzoylbenzenesulfonyl halides (IV) as is shown below for the preparation of 2-benzoylbenzenesulfonyl chlorides:

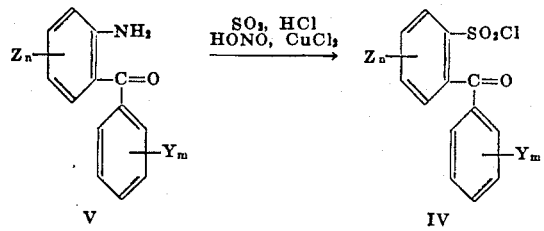

Thus,
2-benzoyl-6-bromobenzenesulfonyl chloride can be derived from 2-amino-3-bromobenzophenone,
2-benzoyl-5-bromobenzenesulfonyl chloride from 2-amino-4-bromobenzophenone,
2-benzoyl-4'-bromobenzenesulfonyl chloride from 2-amino-4'-bromobenzophenone,
2-benzoyl-4-bromobenzenesulfonyl chloride from 2-amino-5-bromobenzophenone,
2-benzoyl-3-bromobenzenesulfonyl chloride from 2-amino-6-bromobenzophenone,
2-benzoyl-4,6-dibromobenzenesulfonyl chloride from 2-amino-3,5-dibromobenzophenone,
2-benzoyl-4-bromo-2'-fluorobenzenesulfonyl chloride from 2-amino-2'-fluoro-5-bromobenzophenone,
2-benzoyl-4-bromo-5-methoxybenzenesulfonyl chloride from 2-amino-4-methoxy-5-bromobenzophenone,
2-benzoyl-4-bromo-4'-methylbenzenesulfonyl chloride from 2-amino-4'-methyl-5-bromobenzophenone,
2-benzoyl-2'-chlorobenzenesulfonyl chloride from 2-amino-2'-chlorobenzophenone,
2-benzoyl-6-chlorobenzenesulfonyl chloride from 2-amino-3-chlorobenzophenone,
2-benzoyl-5-chlorobenzenesulfonyl chloride from 2-amino-4-chlorobenzophenone,
2-benzoyl-4'-chlorobenzenesulfonyl chloride from 2-amino-4'-chlorobenzophenone,
2-benzoyl-4-chlorobenzenesulfonyl chloride from 2-amino-5-chlorobenzophenone,
2-benzoyl-3-chlorobenzenesulfonyl chloride from 2-amino-6-chlorobenzophenone,
2-benzoyl-2',4-dichlorobenzenesulfonyl chloride from 2-amino-2',5-dichlorobenzophenone,
2-benzoyl-4,6-dichlorobenzenesulfonyl chloride from 2-amino-3,5-dichlorobenzophenone,
2-benzoyl-4,5-dichlorobenzenesulfonyl chloride from 2-amino-4,5-dichlorobenzophenone,
2-benzoyl-4,4'-dichlorobenzenesulfonyl chloride from 2-amino-4',5-dichlorobenzophenone,
2-benzoyl-4-chloro-2'-fluorobenzenesulfonyl chloride from 2-amino-2'-fluoro-5-chlorobenzophenone,
2-benzoyl-4-chloro-3'-fluorobenzenesulfonyl chloride from 2-amino-3'-fluoro-5-chlorobenzophenone,
2-benzoyl-4-chloro-4'-fluorobenzenesulfonyl chloride from 2-amino-4'-fluoro-5-chlorobenzophenone,
2-benzoyl-4-methyl-2'-chlorobenzenesulfonyl chloride from 2-amino-2'-chloro-5-methylbenzophenone,
2-benzoyl-4'-methyl-3'-chlorobenzenesulfonyl chloride from 2-amino-3'-chloro-4'-methylbenzophenone.

In a like manner, 2-amino-2'-chloro-4,5-dimethylbenzophenone yields 2-benzoyl-4,5-dimethyl-2'-chlorobenzenesulfonylchloride,
2-amino-2',4'-dichloro-4,5-dimethylbenzophenone yields 2-benzoyl-4,5-dimethyl-2',4'-dichlorobenzenesulfonyl chloride,
2-amino-2',5'-dichloro-4,5-dimethylbenzophenone yields 2-benzoyl-4,5-dimethyl-2',5'-dichlorobenzenesulfonyl chloride,
2-amino-2'-methoxy-5-chlorobenzophenone yields 2-benzoyl-4-chloro-2'-methoxy-benzenesulfonyl chloride,
2-amino-4'-methoxy-5-chlorobenzophenone yields 2-benzoyl-4-chloro-4'-methoxybenzenesulfonyl chloride,
2-amino-2'-methoxy-5-chloro-5'-methylbenzophenone yields 2-benzoyl-5'-methyl-4-chloro-2'-methoxybenzenesulfonyl chloride,
2-amino-2'-fluorobenzophenone yields 2-benzoyl-2'-fluorobenzenesulfonyl chloride,
2-amino-4'-fluorobenzophenone yields 2-benzoyl-4'-fluorobenzenesulfonyl chloride,
2-amino-5-fluorobenzophenone yields 2-benzoyl-4-fluorobenzenesulfonyl chloride,
2-amino-2'-fluoro-5-methylbenzophenone yields 2-benzoyl-4-methyl-2'-fluorobenzenesulfonyl chloride,
2-amino-2'-trifluoromethylbenzophenone yields 2-benzoyl-2'-trifluoromethylbenzenesulfonyl chloride,
2-amino-3'-trifluoromethylbenzophenone yields 2-benzoyl-3'-trifluoromethylbenzenesulfonyl chloride,
2-amino-4-trifluoromethylbenzophenone yields 2-benzoyl-5-trifluoromethylbenzenesulfonyl chloride,
2-amino-2',5-di(trifluoromethyl)benzophenone yields 2-benzoyl-2'-4-di(trifluoromethyl)benzenesulfonyl chloride.

Similarly, 2-amino-2'-methoxybenzophenone produces 2-benzoyl-2'-methoxybenzenesulfonyl chloride,
2-amino-4-methoxybenzophenone produces 2-benzoyl-5-methoxybenzenesulfonyl chloride, 2-amino-4'-methoxybenzophenone produces 2-benzoyl-4'-methoxybenzenesulfonyl chloride,
2-amino-5-methoxybenzophenone produces 2-benzoyl-4-methoxybenzenesulfonyl chloride,
2-amino-2',4-dimethoxybenzophenone produces 2-benzoyl-2',5-dimethoxybenzenesulfonyl chloride,
2-amino-3,4-dimethoxybenzophenone produces 2-benzoyl-5,6-dimethoxybenzenesulfonyl chloride,
2-amino-3',4'-dimethoxybenzophenone produces 2-benzoyl-3',4'-dimethoxybenzenesulfonyl chloride,
2-amino-4,4'5-trimethoxybenzophenone produces 2-benzoyl-4,4'-5-trimethoxybenzenesulfonyl chloride,
2-amino-2',5-dimethyl-3'-methoxybenzophenone produces 2-benzoyl-2',4-dimethyl-3'-methoxybenzenesulfonyl chloride,
2-amino-2'-3'-dimethyl-4'-methoxybenzophenone produces 2-benzoyl-4'-methoxy-2',3'-dimethylbenzenesulfonyl chloride,
2-amino-2',5'-dimethyl-4'-methoxybenzophenone produces 2-benzoyl-2',5'-dimethyl-4'-methoxybenzenesulfonyl chloride,
2-amino-2',4-dimethyl-5-methoxybenzophenone produces 2-benzoyl-4-methoxy-2',5-dimethylbenzenesulfonyl chloride,
2-amino-2'-methyl-5-methoxybenzophenone produces 2-benzoyl-4-methoxy-2'-methylbenzenesulfonyl chloride,
2-amino-3,4-dimethylbenzophenone produces 2-benzoyl-5,6-dimethylbenzenesulfonyl chloride,
2-amino-3-propyl-5-butylbenzophenone produces 2-benzoyl-4-butyl-6-propylbenzenesulfonyl chloride,
2-amino-4-ethyl-4'-butylbenzophenone produces 2-benzoyl-4'-butyl-5-ethylbenzenesulfonyl chloride, etc.

Methods for preparation of 2-aminobenzophenones are taught by Lothrop et al., J. Am. Chem. Soc., 65, 363 (1943), and Sternbach et al., J. Org. Chem., 27, 3781 and 3788 (1962).

Reaction of the 2-benzoylbenzenesulfonyl halide (IV) with hydrazine produces the corresponding 2H-1,2,3-benzothiadiazine-1,1-dioxide. Thus, 8-bromo-4-phenyl-2H-1,2,3-benzothiadiazine-1,1-dioxide can be prepared from 2-benzoyl-6-bromobenzenesulfonyl chloride,
4-phenyl-2H-1,2,3-benzothiadiazine-1,1-dioxide from 2-benzoylbenzenesulfonyl chloride,
6-chloro-4-phenyl-2H-1,2,3-benzothiadiazine-1,1-dioxide from 2-benzoyl-4-chlorobenzenesulfonyl chloride,
7-bromo-4-phenyl-2H-1,2,3-benzothiadiazine-1,1-dioxide from 2-benzoyl-5-bromobenzenesulfonyl chloride,
4-(4-bromophenyl)-2H-1,2,3-benzothiadiazine-1,1-dioxide from 2-benzoyl-4'-bromobenzenesulfonyl chloride,
6,8-dibromo-4-phenyl-2H-1,2,3-benzothiadiazine-1,1-dioxide from 2-benzoyl-4,6-dibromobenzenesulfonyl chloride,
6-bromo-7-methoxy-4-phenyl-2H-1,2,3-benzothiadiazine-1,1-dioxide from 2-benzoyl-4-bromo-5-methoxybenzenesulfonyl chloride,
6-chloro-4-(2-chlorophenyl)-2H-1,2,3-benzothiadiazine-1,1-dioxide from 2-benzoyl-2',4-dichlorobenzenesulfonyl chloride,
6-chloro-4-(3-fluorophenyl)-2H-1,2,3-benzothiadiazine-1,1-dioxide from 2-benzoyl-4-chloro-3'-fluorobenzenesulfonyl chloride,
6,7-dimethyl-4-(2-chlorophenyl)-2H-1,2,3-benzothiadiazine-1,1-dioxide from 2-benzoyl-4,5-dimethyl-2'-chlorobenzenesulfonyl chloride,
6,7-dimethyl-4-(2,5-dichlorophenyl)-2H-1,2,3-benzothiadiazine-1-dioxide from 2-benzoyl-4,5-dimethyl-2',5'-dichlorobenzenesulfonyl chloride,
6-trifluoromethyl-4-(2-trifluoromethylphenyl)-2H-1,2,3-benzothiadiazine-1,1-dioxide from 2-benzoyl-2',4-di(trifluoromethyl)benzenesulfonyl chloride,
6,7-dimethoxy-4-(methoxyphenyl)-2H-1,2,3-benzothiadiazine-1,1-dioxide from 2-benzoyl-4,4',5-trimethoxybenzenesulfonyl chloride,
4-(2,5-dimethyl-4-methoxyphenyl)-2H-1,2,3-benzothiadiazine-1,1-dioxide from 2-benzoyl-2',5'-dimethyl-4'-methoxybenzenesulfonyl chloride,
7-ethyl-4-(4-butylphenyl)-2H-1,2,3-benzothiadiazine-1,1-dioxide from 2-benzoyl-4'-butyl-5-ethylbenzenesulfonyl chloride, etc.

The compounds of this invention are useful as central nervous system stimulants in animals.

In addition, the compounds of this invention form salts with fluosilicic acid. These salts are useful as mothproofing agents in accordance with the teachings of U.S. Patent 1,915,334 and U.S. Patent 2,075,359. The instant compounds also form salts with thiocyanic acid which, in turn, can be condensed with formaldehyde to form resinous materials useful as pickling inhibitors in accordance with U.S. Patent 2,425,320 and U.S. Patent 2,606,155.

Salts of the present compounds with trichloroacetic acid are useful as herbicides against Johnson grass, yellow foxtail, Bermuda grass, quack grass, and the like.

The following examples further illustrate the present invention.

EXAMPLE I

*Preparation of 6-chloro-2-[2-(dimethylamino)ethyl]-4-phenyl-2H-1,2,3-benzothiadiazine-1,1-dioxide*

A solution of 2-(dimethylamino)ethyl chloride hydrochloride (about 14.35 grams, 0.1 mole) in water (about 25 milliliters) was added to a solution of 6-chloro-4-phenyl - 2H - 1,2,3-benzothiadiazine-1,1-dioxide (about 14.6 grams, 0.05 mole), sodium hydroxide (about 8 grams, 0.2 mole), water (about 140 milliliters) and ethanol (about 140 milliliters) chilled to about 8° C. The resulting admixture was then stirred at about room temperature for about 20 hours, thereafter diluted with water (about 250 milliliters), and filtered.

The thus obtained filter cake was washed with water, and about 15.2 grams of a yellow solid melting at about 216° C. (dec.) was recovered. After crystallization from dimethylformamide about 5.4 grams of yellow prismatic crystals melting at about 219° C. (dec.) remained. An additional recrystallization from dimethylformamide did not change the melting point. The crystals were identified as 6-chloro - 2-[2-(dimethylamino)ethyl]-4-phenyl-2H-1,2,3-benzothiadiazine-1,1-dioxide, obtained in about 84 percent yield.

*Analysis.*—Calcd. for $C_{17}H_{18}ClN_3O_2S$: C, 56.12; H, 5.18; Cl, 9.74; N, 11.55; S, 8.81. Found: C, 56.36; H, 5.18; Cl, 9.98; N, 11.71; S, 9.03.

In a like manner, 2-[2-(ethylamino)ethyl]-4-phenyl-2H-1,2,3-benzothiadiazine-1,1-dioxide can be prepared from 4-phenyl-2H-1,2,3-benzothiadiazine-1,1-dioxide and 2 - (ethylamino)ethyl chloride, 7-fluoro-2-[3-(dimethylamino)propyl] - 4 - (3 - chlorophenyl)-2H-1,2,3-benzothiadiazine-1,1-dioxide can be prepared from 7-fluoro-4-(3 - chlorophenyl)-2H-1,2,3-benzothiadiazine-1,1-dioxide and 3-(dimethylamino)propyl chloride, 8-bromo-2-[3-(dibutylamino)propyl] - 4 - (2,3 - dimethyl - 5 - butoxyphenyl) - 2H - 1,2,3 - benzothiadiazine-1,1-dioxide can be prepared from 8 - bromo - 4 - (2,3-dimethyl-5-butoxyphenyl)-2H-1,2,3-benzothiadiazine-1,1-dioxide and 3-(dibutylamino)propyl chloride, etc.

EXAMPLE II

*Preparation of 6-chloro-2-[2-(tertiary-butylamino)ethyl]-4-phenyl-2H-1,2,3-benzothiadiazine-1,1-dioxide hydrochloride*

A solution was prepared of 6-chloro-4-phenyl-2H-1,2,3-benzothiadiazine-1,1-dioxide (about 14.6 grams, 0.05 mole), sodium hydroxide (about 8 grams, 0.02 mole), and 2-(tertiarybutylamino)ethyl chloride hydrochloride (about 17.21 grams, 0.1 mole) in water (about 190 milliliters) and ethanol (about 140 milliliters). The resulting solution was maintained at about room temperature and stirred for about 14 hours, and thereafter diluted with water (about 250 milliliters).

After dilution, the resulting admixture was extracted with methylene chloride, and the obtained extracts dried over magnesium sulfate and concentrated by evaporation of the methylene chloride. The residue obtained in the foregoing manner was then converted to a hydrochloride by the conventional treatment with ethereal hydrogen chloride. The produced solid was recrystallized from isopropanol. About 6.55 grams of colorless prismatic crystals melting at about 264° C. (dec.) was obtained. A second recrystallization from isopropanol yielded colorless prismatic crystals melting at about 260° C. (dec.). The crystals were identified as 6-chloro-2-[2-(tertiary-butylamino)ethyl] - 4 - phenyl - 2H - 1,2,3-benzothiadiazine-1,1-dioxide hydrochloride, obtained in about 30 percent yield.

*Analysis.*—Calcd. for $C_{19}H_{22}ClN_3O_2S \cdot HCl$: C, 53.27; H, 5.41; Cl, 16.55; N, 9.81; S, 7.48. Found: C, 53.55; H, 5.48; Cl, 16.61; N, 9.83; S, 7.43.

The foregoing compound is also useful as a poultry coccidiostat.

EXAMPLE III

*Preparation of 6-chloro-2-[2-(2-methyl-1-pyrrolidinyl) ethyl]-4-phenyl-2H-1,2,3-benzothiadiazine-1,1-dioxide*

A solution was prepared of 6-chloro-4-phenyl-2H-1,2,3-benzothiadiazine-1,1-dioxide (about 14.6 grams, 0.05 mole) and sodium hydroxide (about 8 grams, 0.2 mole) in water (about 140 milliliters) and ethanol (about 140 milliliters). To the resulting solution, chilled to about 5° C., was added a solution of 2-(2-methyl-1-pyrrolidinyl) ethyl chloride hydrochloride (about 18.41 grams, 0.1 mole) in water (about 25 milliliters).

The resulting admixture was stirred at about room temperature for about 18 hours and thereafter extracted with diethyl ether several times. The obtained extracts were then combined, dried by passing over magnesium sulfate, and concentrated by evaporation of the diethyl ether.

The thus obtained residue was crystallized from isopropanol. About 9.5 grams of tan, prismatic crystals melting at about 84°–86° C. was obtained. A second recrystallization from isopropanol yielded tan, prismatic crystals melting at about 85°–86.5° C. The crystals were identified as 6 - chloro - 2 - [2-(2-methyl-1-pyrrolidinyl) ethyl] - 4 - phenyl-2H-1,2,3-benzothiadiazine-1,1-dioxide, obtained in about 47.5 percent yield.

*Analysis.*—Calcd. for $C_{20}H_{22}ClN_3O_2S$: C, 59.47; H, 5.49; Cl, 8.78; N, 10.40; S, 7.94, Found: C, 59.75; H, 5.65; Cl, 8.73; N, 10.72; S, 8.27.

In a like manner,

6 - chloro - 2 - [2-(2,5-dimethyl-1-pyrrolidinyl)ethyl]-4-phenyl-2H-1,2,3-benzothiadiazine-1,1-dioxide can be prepared by substituting 2-(2-5-dimethyl-1-pyrrolidinyl)-ethyl chloride hydrochloride for 2-(2-methyl-1-pyrrolidinyl)ethyl chloride hydrochloride, 6-chloro-2-[2-(tetramethyl-1-pyrrolidinyl)ethyl]-4-phenyl-2H-1,2,3-benzothiadiazine-1,1-dioxide can be prepared using 2-(tetramethyl-1-pyrrolidinyl)ethyl chloride hydrochloride, 6-chloro-2-[2-(2,4-dibutyl-1-pyrrolidinyl)ethyl]-4-phenyl-2H-1,2,3-benzothiadiazine-1,1-dioxide can be prepared using 2-(2,4-dibutyl-1-pyrrolidinyl)ethyl chloride hydrochloride, 6-chloro-2-(2-piperidinoethyl)-4-phenyl-2H-1,2,3-benzothiadiazine-1,1-dioxide can be prepared using 2-piperidinoethyl chloride hydrochloride, 6-chloro-2-[2-(2,5-dibutylpiperidino)ethyl]-4-phenyl-2H-1,2,3-benzothiadiazine-1,1-dioxide can be prepared using 2-(2-(2,5-dibutylpiperidino)ethyl chloride hydrochloride, etc.

EXAMPLE IV

*Preparation of 6-chloro-2-[2-(2-methyl-1-pyrrolidinyl) ethyl] - 4-phenyl-2H-1,2,3-benzothiadiazine-1,1-dioxide hydrochloride*

6 - chloro - 2 - [2-(2-methyl-1-pyrrolidinyl)ethyl]-4-phenyl-2H-1,2,3-benzothiadiazine-1,1-dioxide was reacted with an excess of ethereal hydrogen chloride. Recrystallization from methyl ethyl ketone produced colorless, prismatic crystals melting at about 234°–236° C. The crystals were identified as 6-chloro-2-[2-(2-methyl-1-pyrrolidinyl)ethyl] - 4-phenyl-2H-1,2,3-benzothiadiazine-1,1-dioxide hydrochloride.

*Analysis.*—Calcd. for $C_{20}H_{22}ClN_3O_2S \cdot HCl$: C, 54.55; H, 5.26; Cl, 16.10; N, 9.54; S, 7.28. Found: C, 54.87; H, 5.19; Cl, 15.95; N, 9.76; S, 7.43.

EXAMPLE V

*Preparation of 6-chloro-2-(2-morpholinoethyl)-4-phenyl-2H-1,2,3-benzothiadiazine-1,1-dioxide maleate*

A solution was prepared of 6-chloro-4-phenyl-2H-1,2,3-benzothiadiazine-1,1-dioxide (about 14.6 grams, 0.05 mole) and sodium hydroxide (about 8 grams, 0.2 mole) in water (about 140 milliliters) and ethanol (about 140 milliliters). To the resulting solution, chilled to about 7° C., was added a solution of 4-(2-chloroethyl)morpholine hydrochloride (about 18.61 grams, 0.1 mole) in water (about 25 milliliters).

The resulting admixture was stirred at about room temperature for about 20 hours, diluted with water (about 250 milliliters), and thereafter extracted with methylene chloride several times. The obtained extracts were then combined, dried by passing over magnesium sulfate, and concentrated by evaporation of the methylene chloride.

After concentration, an oily residue remained. The residue was dissolved in diethyl ether with a little ethanol added and the resulting solution was combined with a stoichiometric amount of maleic acid dissolved in diethyl ether-ethanol mixture.

A solid was produced by the combination and was recrystallized from 95 weight percent ethanol. About 13.92 grams of tan, prismatic crystals melting at about 179° C. (dec.) was collected. A second crop of crystals, about 3.15 grams, having a melting point of about 177° C. was also collected. Recrystallization of the crystals initially melting at about 179° C. (dec.) from 95 weight percent ethanol produced tan, prismatic crystals melting at about 180° C. (dec.). The crystals were identified as 6 - chloro-2-(2-morpholinoethyl)-4-phenyl-2H-1,2,3-benzothiadiazine-1,1-dioxide maleate, obtained in about 65 percent yield.

*Analysis.*—Calcd. for $C_{19}H_{20}ClN_3O_3S \cdot C_4H_4O_4$: C, 52.92; H, 4.63; Cl, 6.79; N, 8.05; S, 6.14. Found: C, 52.62; H, 4.62; Cl, 7.13; N, 8.15; S, 6.18.

The foregoing compound is also useful as a poultry coccidiostat and as an in vitro antiviral agent, e.g., against Sindbis virus. In addition, it is useful as an antiallergy agent.

In a similar manner, 6-chloro-2-[2-(2,3,5-triethyl-morpholino)ethyl]-4-phenyl-2H-1,2,3-benzothiadiazine-1,1-dioxide maleate can be prepared using 2,3,5-triethyl-4-(2-chloroethyl)morpholine hydrochloride, 6-chloro-2-[3-(3-butylmorpholino)propyl]-4-phenyl-2H-1,2,3-benzothiadiazine-1,1-dioxide maleate can be prepared using 3-butyl-4-(3-chloropropyl)morpholine hydrochloride, 6-chloro-2-[2-(2,3,5-triethyl-morpholino)ethyl]-4-phenyl-2H-1,2,3-benzothiadiazine-1,1-dioxide maleate can be prepared using 2-methyl-4-(2-chloroethyl)-5-ethylmorpholine hydrochloride, etc.

EXAMPLE VI

*Preparation of 6-chloro-2-[3-(dimethylamino)propyl]-4-phenyl-2H-1,2,3-benzothiadiazine-1,1-dioxide maleate*

A solution of 6-chloro-4-phenyl-2H-1,2,3-benzothiadiazine-1,1-dioxide (about 14.6 grams, 0.05 mole), sodium hydroxide (about 4 grams, 0.1 mole), and 3-(dimethylamino)propyl chloride (about 12.16 grams, 0.1 mole) in water (about 140 milliliters) and ethanol (about 140 milliliters) was refluxed with stirring for about 24 hours, cooled to about room temperature, and then diluted with water (about 250 milliliters).

The resulting admixture was extracted with methylene chloride several times, and the obtained extracts were combined. The combined extracts were dried over magnesium sulfate and concentrated by evaporating the methylene chloride. About 17.2 grams of a yellow oil was obtained as the residue and was chromatographed over about 500 grams of 60–200 mesh silica gel. Elution with 1:1 volume ratio of ethyl acetate and cyclohexane and finally with ethyl acetate gave about 8.33 grams of the starting reactant, 6-chloro-4-phenyl-2H-1,2,3-benzothiadiazine-1,1-dioxide. Further elution with 1:1 volume ratio of methanol and ethyl acetate yielded about 4.67 grams of a yellow oil.

The oil was dissolved in absolute ethanol and then treated with an ethanolic solution of maleic acid (slight excess). Thereafter, the treated solution was diluted with diethyl ether and filtered. About 3.7 grams of cream-colored, prismatic crystals melting at about 138°–140° C. were recovered.

After three recrystallizations from isopropanol about 3.24 grams of yellow-tinted, prismatic crystals melting constantly at about 147°–148° C. was obtained. The crystals were identified as 6-chloro-2-[3-(dimethylamino)-propyl]-4-phenyl-2H-1,2,3-benzothiadiazine-1,1-dioxide maleate.

*Analysis.*—Calcd. for $C_{18}H_{20}ClN_3O_2S \cdot C_4H_4O_4$: C, 53.49; H, 4.90; Cl, 7.18; N, 8.51; S, 6.49. Found: C, 53.74; H, 4.60; Cl, 7.24; N, 8.29; S, 6.51.

The foregoing compound is also useful as an anorexigenic agent.

EXAMPLE VII

*Preparation of 6-chloro-2-[2-(diethylamino)ethyl]-4-phenyl-2H-1,2,3-benzothiadiazine-1,1-dioxide hydrochloride*

A solution was prepared of 6-chloro-4-phenyl-2H-1,2,3-benzothiadiazine-1,1-dioxide (about 34.15 grams, 0.116 mole) in 2.5 weight percent aqueous sodium hydroxide solution (about 230 milliliters) and ethanol (about 330 milliliters). The resulting solution was chilled to about 10° C. and 2-(diethylamino)ethyl chloride (about 23.6 grams, 0.174 mole) was added thereto.

The resulting admixture was stirred at about room temperature for about 20 hours, then diluted with water (about 500 milliliters), and thereafter extracted with four 250-milliliter aliquots of diethyl ether. The extracts were combined, dried over magnesium sulfate, saturated with anhydrous hydrogen chloride, and filtered.

The precipitate recovered by the filtration was washed well with diethyl ether and dried. About 42 grams of a cream-colored solid melting at about 199° C. (dec.) was obtained. Recrystallization from an isopropanol-ethanol mixture (volume ratio of about 10:1, respectively) and then from absolute ethanol yielded colorless platelets melting at about 225° C. (dec.). The produced compound was identified as 6-chloro-2-[(diethylamino)-ethyl] - 4 - phenyl - 2H - 1,2,3 - benzothiadiazine - 1,1-dioxide hydrochloride.

*Analysis.*—Calcd. for $C_{19}H_{22}ClN_3O_2S \cdot HCl$: C, 53.27; H, 5.41; Cl, 16.55; N, 9.81; S, 7.48. Found: C, 52.80; H, 5.60; Cl, 16.22; N, 9.78; S, 7.52.

I claim:

1. A 2H-1,2,3-benzothiadiazine-1,1-dioxide represented by the structural formula

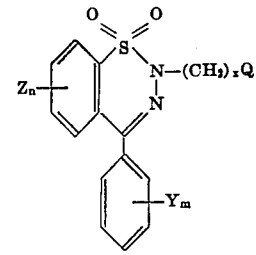

wherein Q is a member of the group consisting of alkylamino, 1-pyrrolidinyl, alkyl-substituted 1-pyrrolidinyl, piperidino, alkyl-substituted piperidino, morpholino, and alkyl-substituted morpholino radicals, Z and Y are members of the group consisting of halo, trifluoromethyl, alkyl and alkoxy radicals, $x$ is an integer having a value from 2 to 3, inclusive, and $m$ and $n$ are integers having a value from 0 to 3, inclusive, with the proviso that the alkyl portions of the foregoing radicals contain no more than four carbon atoms; and the corresponding acid addition salts thereof.

2. The 2H-1,2,3-benzothiadiazine-1,1-dioxide in accordance with claim 1 wherein Q is dimethylamino, $x$ has a value of 2, Z is chloro situated in the 6-position, $n$ has a value of 1, and $m$ is zero.

3. The 2H-1,2,3-benzothiadiazine-1,1-dioxide in accordance with claim 1 wherein Q is tertiary-butylamino, $x$ has a value of 2, Z is chloro situated in the 6-position, $n$ has a value of 1, and $m$ is zero.

4. The 2H-1,2,3-benzothiadiazine-1,1-dioxide in accordance with claim 1 wherein Q is 2-methyl-1-pyrrolidinyl, $x$ has a value of 2, Z is chloro situated in the 6-position, $n$ has a value of 1, and $m$ is zero.

5. The 2H-1,2,3-benzothiadiazine-1,1-dioxide hydrochloride in accordance with claim 1 wherein Q is 2-methyl-1-pyrrolidinyl, $x$ has a value of 2, Z is chloro situated in the 6-position, $n$ has a value of 1, and $m$ is zero.

6. The 2H-1,2,3-benzothiadiazine-1,1-dioxide maleate in accordance with claim 1 wherein Q is morpholino, $x$ has a value of 2, Z is chloro situated in the 6-position, $n$ has a value of 1, and $m$ is zero.

7. The 2H-1,2,3-benzothiadiazine-1,1-dioxide maleate in accordance with claim 1 wherein Q is dimethylamino, $x$ has a value of 3, Z is chloro situated in the 6-position, $n$ has a value of 1, and $m$ is zero.

8. The 2H-1,2,3-benzothiadiazine-1,1-dioxide hydrochloride in accordance with claim 1 wherein Q is diethylamino, $x$ has a value of 2, Z is chloro situated in the 6-position, $n$ has a value of 1, and $m$ is zero.

References Cited

UNITED STATES PATENTS 2,402,611  6/1946  Dickey et al. _____ 260—243

FOREIGN PATENTS 928,552  6/1963  Great Britain.

HENRY R. JILES, *Primary Examiner.*

J. M. FORD, *Assistant Examiner.*

UNITED STATES PATENT OFFICE
CERTIFICATE OF CORRECTION

Patent No. 3,407,198

October 22, 19

John B. Wright

It is certified that error appears in the above identified patent and that said Letters Patent are hereby corrected as shown below:

Column 5, line 11, "2-amino-4,4'5-" should read -- 2-amino-4,4',5- --; line 12, "2-benzoyl-4,4'-5-" should read -- 2-benzoyl-4,4',5- --; line 16, "2-amino-2'-3'-" should read -- 2-amino-2',3'- --; line 68, "-benzothiadiazin 1-dioxide" should read -- -benzothiadiazine-1,1-dioxide --; line 73, "6,7-dimethoxy-4-(methoxyphenyl)-" should read -- 6,7-dimethoxy-4-(4-methoxyphenyl --. Column 6, line 39, "crystallization" should read -- recrystallization -- Column 7, line 14, "260° C." should read -- 265° C. --. Column 8, line 5, "2-(2-(2,5-dibutyl" should read -- 2-(2,5-dibutyl --; line 12, "6-chloro-2-[2- should read -- 6-Chloro-2-[2- --. Column 9, lines 1 and 2, "6-chloro-2-[2-2,3,5-triethyl-morpholino) ethyl]-4-phenyl-2H-1,2,3-benzothiadiazine-1,1-dioxide maleate" should read -- 6-chloro-2-[2-(2-methyl-5-ethyl-morpholino) ethyl]-4-phenyl-2H-1,2,3-benzothiadiazine-1,1-dioxide maleate --.

Signed and sealed this 17th day of March 1970.

(SEAL)
Attest:

EDWARD M. FLETCHER, JR.
Attesting Officer

WILLIAM E. SCHUYLER, C
Commissioner of Patent